(12) United States Patent
Takahashi et al.

(10) Patent No.: US 9,112,402 B2
(45) Date of Patent: Aug. 18, 2015

(54) POWER CONVERSION APPARATUS

(75) Inventors: Masayoshi Takahashi, West Bloomfield, MI (US); Keisuke Fukumasu, Fujisawa (JP); Makoto Torigoe, Ayase (JP); Tomohiko Suematsu, Hitachinaka (JP); Satoru Shigeta, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 378 days.

(21) Appl. No.: 13/518,716

(22) PCT Filed: Dec. 15, 2010

(86) PCT No.: PCT/JP2010/007263
§ 371 (c)(1),
(2), (4) Date: Aug. 24, 2012

(87) PCT Pub. No.: WO2011/077665
PCT Pub. Date: Jun. 30, 2011

(65) Prior Publication Data
US 2012/0326799 A1    Dec. 27, 2012

(30) Foreign Application Priority Data
Dec. 25, 2009 (JP) .................. 2009-293692

(51) Int. Cl.
*H04B 3/28* (2006.01)
*H02M 7/00* (2006.01)
*H02M 1/44* (2007.01)

(52) U.S. Cl.
CPC ............ *H02M 7/003* (2013.01); *H02M 1/44* (2013.01)

(58) Field of Classification Search
CPC ...... H02M 7/003; H02M 1/44; H03H 1/0007; H04B 3/28
USPC ....................... 333/12; 318/400.24
See application file for complete search history.

(56) References Cited

U.S. PATENT DOCUMENTS 6,633,800 B1 * 10/2003 Ward et al. .................. 701/2
8,290,451 B2   10/2012 Komatsu et al.
(Continued)

FOREIGN PATENT DOCUMENTS

CN    2731907 Y    10/2005
CN    101411057 A   4/2009
(Continued)

OTHER PUBLICATIONS

Chinese Office Action dated Apr. 1, 2014 (seven (7) pages).
(Continued)

*Primary Examiner* — Robert Pascal
*Assistant Examiner* — Kimberly Glenn
(74) *Attorney, Agent, or Firm* — Crowell & Moring LLP

(57) ABSTRACT

There is provided a power conversion apparatus which allows a noise current or voltage to be suppressed at a low cost and in a small size, the noise current or voltage mixing into the power conversion apparatus by propagating through a control wiring connected to an external appliance.
The power conversion apparatus includes a housing, connection terminals provided on the housing, a control-circuit unit provided inside the housing, a wiring for establishing the connection between the connection terminals and the control-circuit unit, a first noise-removing unit connected between the wiring and the ground potential of the housing, and a second noise-removing unit connected between the wiring and the ground potential of the housing, and also in parallel to the first noise-removing unit.

10 Claims, 7 Drawing Sheets

(56) References Cited

U.S. PATENT DOCUMENTS

| | | |
|---|---|---|
| 2004/0257841 A1 | 12/2004 | Taguchi et al. |
| 2006/0244401 A1 | 11/2006 | Chida et al. |
| 2006/0258217 A1 | 11/2006 | Hirai |
| 2007/0002594 A1 | 1/2007 | Otsuka et al. |
| 2009/0225523 A1 | 9/2009 | Onishi et al. |
| 2010/0090630 A1 | 4/2010 | Chida et al. |

FOREIGN PATENT DOCUMENTS

| | | |
|---|---|---|
| EP | 1 237 264 A2 | 9/2002 |
| JP | 7-307637 A | 11/1995 |
| JP | 2000-223799 A | 8/2000 |
| JP | 2004-153951 A | 5/2004 |
| JP | 2005-20868 A | 1/2005 |
| JP | 2008-42124 A | 2/2006 |
| JP | 2006-80215 A | 3/2006 |
| JP | 2006-204027 A | 8/2006 |
| JP | 2006-230064 A | 8/2006 |
| JP | 2006-311697 A | 11/2006 |
| JP | 2007-12685 A | 1/2007 |
| JP | 2007-59810 A | 3/2007 |
| JP | 2008-295126 A | 12/2008 |
| JP | 2009-27840 A | 2/2009 |
| JP | 2009-105178 A | 5/2009 |
| WO | WO 2010050428 A1 * | 5/2010 |

OTHER PUBLICATIONS

International Search Report with English translation dated Mar. 8, 2011 (four (4) pages).

Extended European Search Report dated Nov. 12, 2014 (six (6) pages).

* cited by examiner

POWER CONVERSION APPARATUS

TECHNICAL FIELD

The present invention relates to a power conversion apparatus which allows a noise current or voltage to be suppressed at a low cost and in a small size, the noise current or voltage mixing into the power conversion apparatus by propagating through a control wiring connected to an external appliance.

BACKGROUND ART

A power conversion apparatus such as an inverter, which generates an AC voltage from a DC power-source such as a battery, is so constituted as to include the following configuration components: A main circuit (: power module) so constituted as to include components such as switching elements, a driving circuit (: gate driver) for generating a signal for driving the switching elements, a smoothing capacitor, a control circuit (: motor controller) for generating an operation signal to be transmitted to the driving circuit, and the like.

This type of power conversion apparatus performs the transmission/reception of the signals by connecting the control circuit inside the apparatus and a plurality of external appliances and sensors to each other with the use of a control wiring. This type of power conversion apparatus, however, is accompanied by the following problem: Namely, noise current and voltage, which mix into the power conversion apparatus by propagating through the control wiring, give rise to the occurrence of malfunctions of the control circuit and sensor circuits inside the apparatus. Accordingly, it is requested to devise a circuit-based or structure-based ingenuity for reducing the noise current and voltage which mix into the apparatus.

In order to reduce the electromagnetic noises which mix into the in-apparatus control circuit and the like through the control wiring, there exists a method of inserting a loss component or noise filter (capacitor) into the connection portion of the control wiring and an in-apparatus board and the like.

For example, there has been known PATENT LITERATURE 1 (JP-A-7-307637), where the disclosure has been made as follows: "A print-wiring-board-use noise filter wherein a large number of penetration-type noise filters are provided on a long and narrow strip-like board with a constant spacing placed therebetween, each of the penetration-type noise filters being configured by connecting a reactance element to a conduction wire, the conduction wire being orthogonal to a predetermined board, and penetrating the board, one end of each conduction wire of each penetration-type noise filter being connected to each connection end of a plurality of print wirings provided on a print wiring board, the other end of each conduction wire of each penetration-type noise filter being connected to each connection end of a plurality of print wirings provided on the other print wiring board."

CITATION LIST

Patent Literature

PATENT LITERATURE 1: JP-A-7-307637

SUMMARY OF INVENTION

Technical Problem

In the configuration disclosed in PATENT LITERATURE 1 (JP-A-7-307637), however, there exists a problem that the apparatus presents a high cost since the reactance element is expensive. Also, when the noise filter (capacitor) is deployed on the board, the noise current is injected into the board GND via this capacitor. As a result, there exists a problem that there will occur malfunctions of the in-apparatus sensors and the on-board circuits. Also, when the noise filter (capacitor) is inserted into the connection portion of the control wiring and the in-apparatus board and the like, there exists a problem that the electromagnetic-noises reduction effect is tremendously deteriorated depending on the in-board wiring length after the electromagnetic noises have passed through the noise filter.

Accordingly, an object of the present invention is to provide a power conversion apparatus which allows the noise current or voltage to be suppressed at a low cost and in a small size, the noise current or voltage mixing into the power conversion apparatus by propagating through the control wiring connected to an external appliance.

Solution to Problem

Of the inventions to be disclosed in the present application, the outline of the representative ones will be briefly explained as follows:

(1) A power conversion apparatus, including a housing, connection terminals provided on the housing, a control-circuit unit provided inside the housing, a wiring for establishing the connection between the connection terminals and the control-circuit unit, a first noise-removing unit connected between the wiring and the ground potential of the housing, and a second noise-removing unit connected between the wiring and the ground potential of the housing, and also in parallel to the first noise-removing unit.

(2) The power conversion apparatus described in (1), wherein the distance is shorter than one-half of the wavelength of a noise at its maximum frequency, the noise being to be removed, the distance being a distance between a position on the wiring to which the first noise-removing unit is connected and a position on the wiring to which the second noise-removing unit is connected.

(3) The power conversion apparatus described in (1) or (2), wherein the distance is equal to one-fourth of the wavelength of a noise at its maximum frequency, the noise being to be removed, the distance being a distance between a position on the wiring to which the first noise-removing unit is connected and a position on the wiring to which the second noise-removing unit is connected.

Advantageous Effects of Invention

According to the present invention, it becomes possible to provide the power conversion apparatus which allows the noise current or voltage to be suppressed at a low cost and in a small size, the noise current or voltage mixing into the power conversion apparatus by propagating through the control wiring connected to an external appliance.

DESCRIPTION OF EMBODIMENTS

Figure 1:
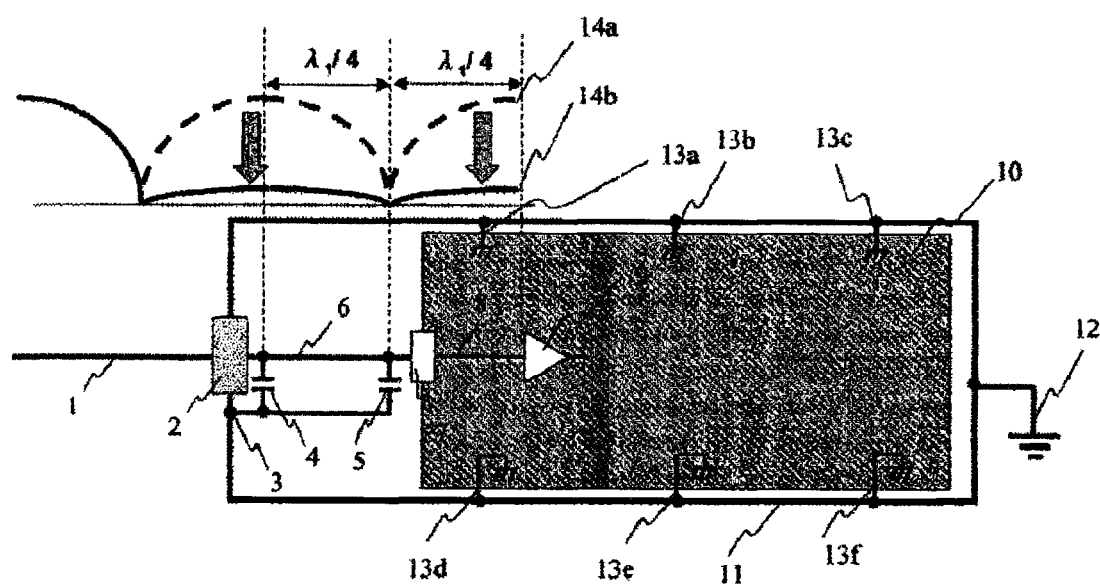
FIG. 1 is an explanatory diagram for explaining a first embodiment of the power conversion apparatus according to the present invention.

Hereinafter, based on the drawings, the detailed explanation will be given below concerning embodiments of the power conversion apparatus according to the present invention. Incidentally, in all of the drawings for explaining the embodiments, the same reference numerals will be allocated to the same configuration members in principle. Accordingly, their repeated explanation will be omitted there.

In the embodiments which will be explained hereinafter, the explanation will be given selecting a vehicle-installation-use inverter apparatus as an example of the power conversion apparatus to which the present invention is to be applied. The incoming-noise-resistant property (i.e., immunity) is exceedingly severe for the vehicle-installation-use inverter apparatus. The vehicle-installation-use inverter apparatus is installed on a vehicle-installed electrical system as a control apparatus for controlling the driving for a vehicle-installed electric motor. The inverter apparatus controls the driving for the vehicle-installed electric motor in accordance with the following way: Namely, the inverter apparatus receives a DC power supplied from a vehicle-installed battery constituting the vehicle-installed power-source. Moreover, the inverter apparatus converts the DC power to a predetermined AC power, then supplying the generated AC power to the vehicle-installed electric motor. Here, in order to ensure safety and reliability, each car maker uniquely stipulates noise-resistant-property criterions for the vehicle-installation-use inverter apparatus on the basis of the standards such as ISO-11452. These criterions are made severer as compared with the criterions for common electric appliances. For example, in the radiation immunity test, the presence or absence of an error is confirmed by irradiating a test target with a strong electric field using a biconical antenna or horn antenna. Here, the electric-field intensity with which the common electric appliances are irradiated is made equal to about 3 to 10 V/m. On the other hand, the electric-field intensity with which the vehicle-installation-use inverter apparatus is irradiated is made equal to about 70 to 150 V/m, which is more than 10 times as high as the case of the common electric appliances. For example, as an example of the test, there is a case where the electric-field irradiation ranging from 200 MHz to 1 GHz is applied to the control wiring. This electric-field irradiation causes a frequency-equal current noise to mix into the vehicle-installation-use inverter apparatus through the control wiring. This phenomenon often gives rise to the occurrence of malfunctions of the circuits inside the inverter apparatus. In this case, the frequency at which the malfunctions are caused to occur is often equal to 400 MHz to 1 GHz. One cause for this situation is considered to be the cavity resonance due to the case size of the vehicle-installation-use inverter apparatus.

Incidentally, hereinafter, the explanation will be given below selecting the vehicle-installation-use inverter apparatus as the example. Not being limited thereto, however, the present invention is also applicable to DC-to-DC power conversion apparatuses such as DC/DC converter and DC chopper, AC-to-DC power conversion apparatuses, and the like. Also, the configurations which will be explained hereinafter are used for an industry-use power conversion apparatus used as a control apparatus for controlling an electric motor for driving facilities of a factory, and a home-use solar-light power generation system. Also, the configurations are also applicable to a home-use power conversion apparatus used in a control apparatus for controlling an electric motor for driving home-use electric products. In particular, it is preferable to apply the configurations to a power conversion apparatus which is targeted for its low-cost implementation and small-sized implementation.

Figure 12:
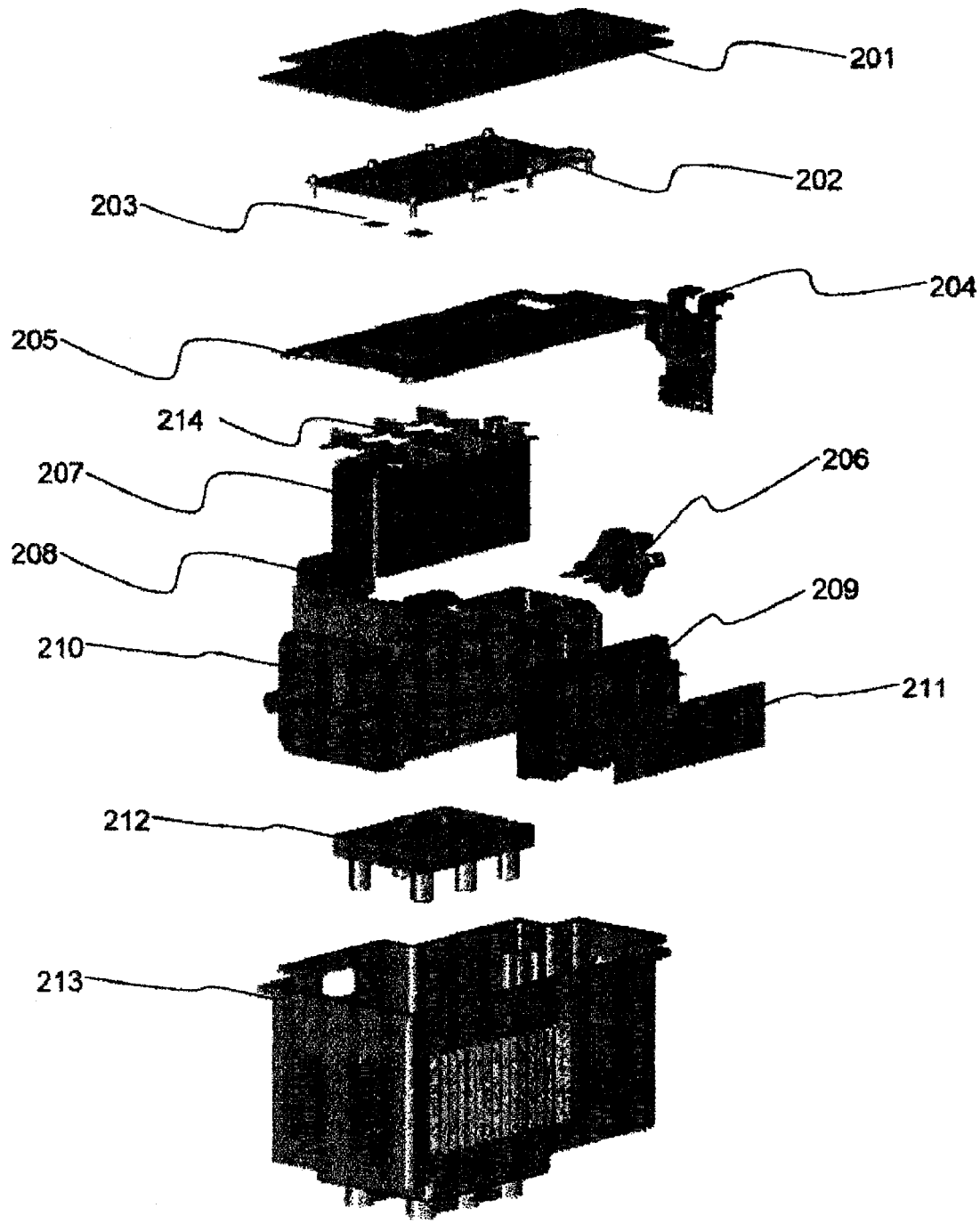
FIG. 12 is a diagram for illustrating the structure of the vehicle-installed power conversion apparatus according to the present invention.
Figure 13:
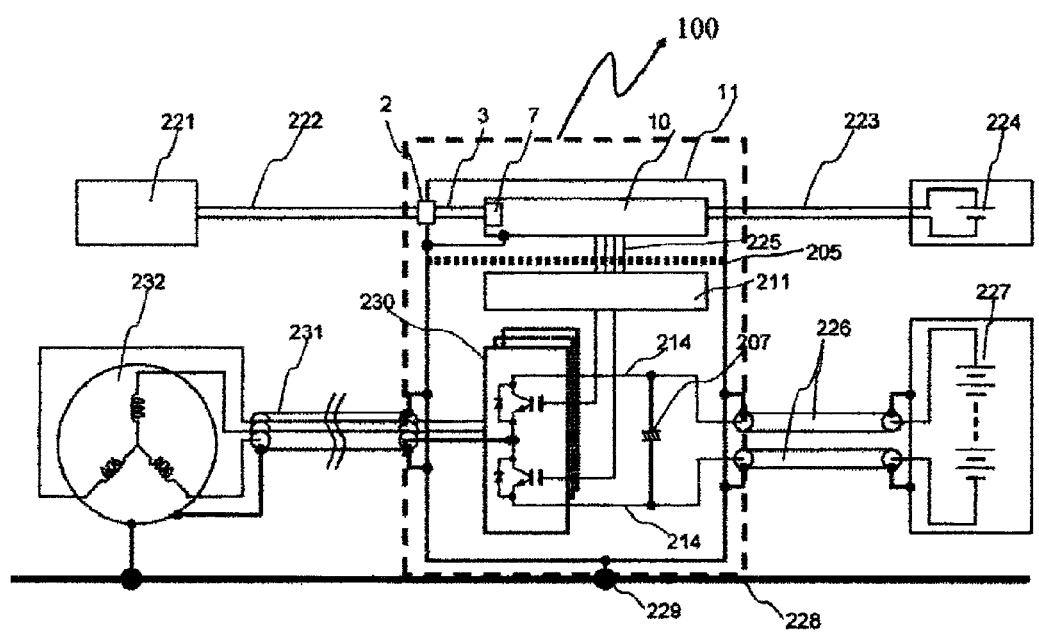
FIG. 13 is a diagram for illustrating the configuration of the vehicle-installed power conversion apparatus according to the present invention.

First, referring to FIG. 12 and FIG. 13, the explanation will be given below concerning the configuration of the power conversion apparatus. FIG. 12 is a diagram for illustrating the structure of the vehicle-installed power conversion apparatus according to the present invention. FIG. 13 is an equivalent-circuit diagram for illustrating the electrical connection of the vehicle-installed power conversion apparatus according to the present invention and the peripheral devices associated therewith.

The power conversion apparatus Illustrated in FIG. 12 includes the following configuration components: A power module 209, a smoothing capacitor 207 for performing the switching-time electric-charge supply at a high speed and with a low noise, a gate driver 211 for driving the gates of switching elements mounted on the power module 209, a cooling mechanism 210 for cooling components such as the power module 209 and the smoothing capacitor 207, an external-appliance-connection-use connector 208, a DC terminal 204 and a DC connector 206 for connecting a high-voltage battery connected to the outside of the power conversion apparatus, a bus bar 214 used as a wiring for supplying the high voltage to the components such as the power module 209 and the smoothing capacitor 207, an AC terminal or AC connector 212 for connecting an AC-converted current to motors, a control-circuit board 202 which implements thereon a control circuit for issuing a motor control signal to the gate driver 211, a control-circuit-board-use base 205 which implements the control-circuit board 202 thereon, a case 213 for storing the respective components into a single housing, and a cover 201 for sealing the housing.

Incidentally, in the power conversion apparatus, a case is assumed where there are provided the two units of motors to be driven. Namely, the structure is given in such a manner that two sets of the power module 209 and the gate driver 211 can be mounted. These numbers, however, are not limited to the two sets. This is because these numbers depend on the number of the motors to be driven, or the number of loads corresponding thereto.

Here, the power-related circuits for performing the switching operation are likely to cause noises to occur. Meanwhile, the electronics-based components such as the harness cable and board are likely to undergo influences of the noises. Accordingly, it is preferable that the power-related circuits be deployed at a position apart from the electronics-based components. Namely, it is desirable that the power module 209, the gate driver 211, the cooling mechanism 210, the smoothing capacitor 207, the bus bar 214, the AC terminal 212, and the DC terminal 204 be all assembled into a space which is partitioned by the control-circuit-board-use base 205 implementing the control-circuit board 202 thereon, and which is positioned below the base 205. The control-circuit board 202 is implemented and deployed into a space which is positioned above the control-circuit-board-use base 205, whose fore-and-aft and right-and-left sides are closed by the case 213 of the power conversion apparatus, and whose uppermost side is closed by the cover 201 of the power conversion apparatus. Similarly, the external-appliance-connection-use connector 208 for establishing the connection between the control-circuit board 202 and an external appliance outside the power conversion apparatus is implemented on the control-circuit board 202 or a connector-dedicated board. Simultaneously, the connector 208 is implemented into the space which is positioned above the control-circuit-board-use base 205 as is the case with the control-circuit board 202. The configuration like this makes it possible to acquire an effect of making it unlikely that the electronics-based components will undergo the influences of the noises caused by the power-related circuits.

In the equivalent-circuit diagram in FIG. 13 for illustrating the electrical connection of the power conversion apparatus according to the present invention and the peripheral devices associated therewith, the electrical connection is as follows: A motor 232, i.e., a load, and a high-voltage battery 227, and a power conversion apparatus 100 are connected to each other by a shield cable 231. Moreover, the GND of the shield cable 231 and the housing of the motor 232 are connected to a chassis GND 228. The housing of the high-voltage battery 227 and the GND of a high-voltage DC cable 226 are similarly connected to the GND 228.

Here, a control-circuit board 10 is operated based on a 12-V (or 24-V) power-source supplied from a 12-V (or 24-V) vehicle-installed battery 224 via a power-source wiring 223. The control-circuit board 10 mounts thereon components such as a motor-angle detection circuit for detecting the rotation angle of the motor 232, a transceiver for performing communications with an external appliance outside the power conversion apparatus, and a microcontroller for controlling these components. Also, a motor-current detection circuit for detecting a current flowing through the motor 232 is provided inside a case 11. These circuits are operated at a 5-V-or-less power-source voltage. As a result, there is a possibility that malfunctions of these circuits are caused to occur by incoming noises. In particular, the motor-angle detection circuit (: resolver circuit) and the motor-current detection circuit are equipped with a function of converting analog values of the voltage and current into digital values, and transmitting the digital values to the microcontroller via a signal line. These analog values, however, are likely to give rise to the occurrence of the performance deterioration or malfunctions due to superposition of the noises.

Here, the control-circuit board 10 is connected to an external appliance 221 (such as an engine controller) via a control wiring 222. As a result, there has been known the following fact: Namely, the incoming noises propagate up to the control-circuit board 10 through the control wiring 222. Consequently, it is requested to block the occurrence of malfunctions due to these noises in order to accomplish safety of the vehicle.

Here, as illustrated in FIG. 13, a power module 230 (which is equivalent to 209 in FIG. 12) is equipped with a plurality of semiconductor power switching elements such as IGBTs and flywheel diodes. The gate driver 211 receives an ON/OFF control signal of the switching elements from the control-circuit board 10 via a board connection line 225, thereby performing the switching control over the power module 230. Incidentally, it is also possible not to use the flywheel diodes, if MOSFETs are used as the power switching elements.

Also, the base 205 is composed of a material such as a metal, which has a higher electrical conductivity than the control-circuit board 10 (which is equivalent to 202 in FIG. 12). The case 213, the cover 201, the base 205, and the cooling mechanism 210 are all connected to each other physically and electrically. It is desirable that the base 205 is also maintained at the GND potential by connecting the cases 213 and 11 to the chassis GND 228 (which is equivalent to 12 in FIG. 1) of the vehicle at, e.g., the connection point 229.

Embodiment 1

Next, referring to FIG. 1, the explanation will be given below concerning a first embodiment of the present invention. FIG. 1 is an explanatory diagram for explaining the first embodiment of the power conversion apparatus according to the present invention. FIG. 1 is a top view of the power conversion apparatus in FIG. 12 in a case where the cover 201 is removed therefrom.

The case 11 (which is equivalent to 213 in FIG. 12) of the power conversion apparatus is GND-connected to the chassis GND 228 in FIG. 13 at a connection point 12 (which is equivalent to 229 in FIG. 13). Case GNDs 13a to 13f of the control-circuit board 10 (which is equivalent to 202 in FIG. 12) are supplied from the case 11 via a control-circuit-board-use base (which is equivalent to 205 in FIG. 12) as described earlier. A control wiring 1, an external-appliance-connection-use connector 2, and a board connector 7 for establishing the connection between the control-circuit board 10 and an external appliance outside the power conversion apparatus are connected to each other via a signal wiring (18 or) 6 inside the case 11. Moreover, the board connector 7 and an amplifier 9 are connected to each other via a signal wiring 8 inside the control-circuit board 10. Here, the amplifier 9 is described as a circuit example on the control-circuit board 10 connected to the control wiring 1. Not being limited to the amplifier 9, however, other circuit examples such as microcomputer, transceiver, and comparator are also applicable.

Here, in the present first embodiment, noise-removing components 4 and 5 are set up between the signal wiring 6 and a connection point 3 in such a manner that the components 4 and 5 become parallel to each other. Capacitors are illustrated as the noise-removing components 4 and 5 in FIG. 1. Not being limited to the capacitors, however, some other configurations having parasitic capacitance are also applicable. The noise-removing components 4 and 5 are set up between the signal wiring 6 and the connection point 3 in such a manner that the components 4 and 5 become parallel to each other. This set-up successfully eliminates the problem in the conventional technologies, i.e., the electromagnetic-noises reduction effect is tremendously deteriorated depending on the in-board wiring length after the electromagnetic noises have passed through the noise filter. This result makes it possible to suppress the deterioration in the electromagnetic-noises reduction effect. As a consequence, it becomes possible to provide the power conversion apparatus which allows implementation of an enhancement in the immunity performance of the inverter.

Moreover, in the conventional power conversion apparatus, if the input impedance of the amplifier 9 is assumed to be the Hi impedance, there has existed the following problem: Namely, at a frequency at which the wiring length of the signal wiring 8 becomes equal to one-fourth of the wavelength of an incoming noise, there appears, on the signal wiring 8, a standing wave whose node is the capacitor for establishing a shore-circuit into GND. As a consequence, it turns out that the resultant large noise mixes into the control-circuit board 10. Meanwhile, in the present first embodiment, the path electric length of the signal wiring 6 between both of the noise-removing components 4 and 5 is set at a path electric length which is shorter than one-half of the wavelength of the noise at its maximum frequency. This setting makes it possible to suppress this standing wave.

The reason why this setting makes it possible to suppress this standing wave is as follows: Namely, the path electric length of the signal wiring 6 is so set as to become shorter than the one-half of the wavelength of the standing wave. As a result, at the high frequency, the noise-removing components 4 and 5 are short-circuited into the connection point 3 connected to the GND. This short-circuit suppresses and prevents the standing wave from propagating through the signal wiring 8, thereby making it possible to suppress and prevent the noise from intruding into the control-circuit board 10. Concretely, in a path through which a suppression-target noise is propagating, even if the noise-removing component 4 is positioned at a node portion of the suppression-target noise, the noise-removing component 5 simultaneously causes a not-node amplitude point to be short-circuited into the GND. This short-circuit makes it possible to suppress the propagation of the noise. As a consequence, it becomes possible to reduce the noise-current waveform from the waveform 14a to the waveform 14b.

Furthermore, it is desirable that the path electric length of the signal wiring 6 be set at the one-fourth of the wavelength of the standing wave. If the path electric length of the signal wiring 6 is set at the one-fourth of the wavelength of the standing wave, it becomes possible to acquire even larger noise-propagation suppression effect. The reason for the acquisition of this effect is as follows: Namely, even if the noise-removing component 4 is positioned at the node of the suppression-target noise, the noise-removing component 5 simultaneously causes the maximum-amplitude point to be short-circuited into the GND. This short-circuit allows implementation of the largest noise-propagation suppression effect.

Here, consideration is given to the case where the path electric length of the signal wiring 6 is equal to the one-half of the wavelength of the noise at its maximum frequency, which presents the problem. In this case, it turns out that the noise-removing components 4 and 5 cause the node portions of the standing wave to be short-circuited into the GND simultaneously. Accordingly, attention should be given to the fact that the noise amplitude cannot be suppressed, depending on the path electric length of the signal wiring 8.

Embodiment 2

Figure 2:
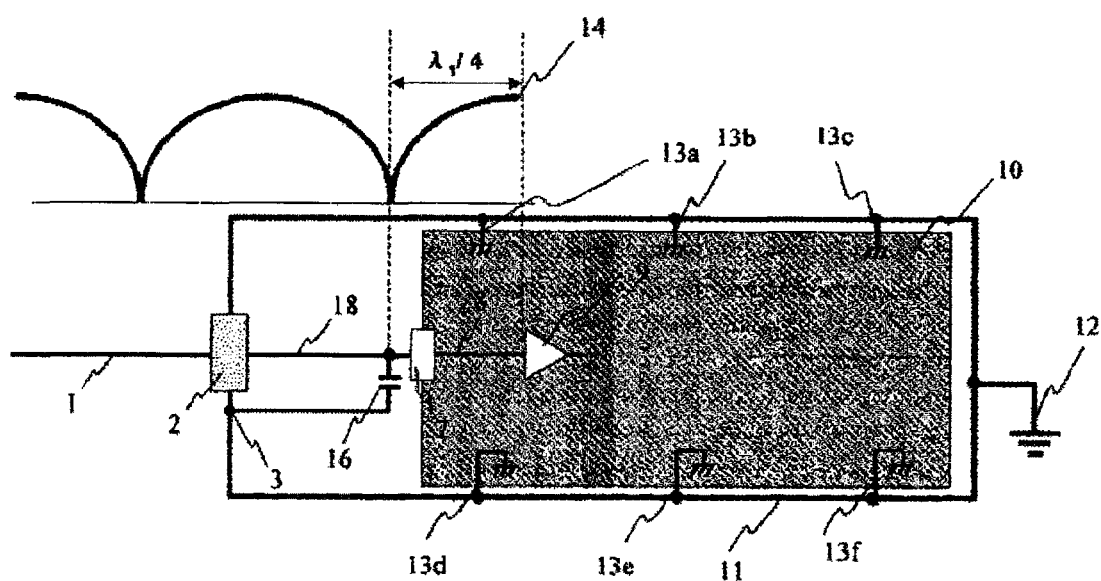
FIG. 2 is an explanatory diagram for explaining a second embodiment of the power conversion apparatus according to the present invention.

Next, referring to FIG. 2, the explanation will be given below regarding a second embodiment of the present invention. FIG. 2 is an explanatory diagram for explaining the second embodiment of the power conversion apparatus according to the present invention. FIG. 2 is a top view of the power conversion apparatus in FIG. 12 in the case where the cover 201 is removed therefrom.

The point in which the power conversion apparatus in FIG. 2 differs from the one in FIG. 1 is as follows: Namely, a noise-removing component 16 is set up between the signal wiring 18 and the connection point 3. Moreover, one end of the noise-removing component 16 is connected to the signal wiring 18. Meanwhile, the other end of the component 16 is connected not to the GND on the control-circuit board 10, but to the case 11 at the connection point 3. Here, consideration is given to a case where the path electric length ranging from the noise-removing component 16 to the input of the amplifier 9 is sufficiently shorter than the one-fourth of the wavelength of a noise current which will mix into the power conversion apparatus by propagating through the control wiring 1. In this case, the above-described configuration of the noise-removing component 16 allows the noise current to flow directly to the case 11 via the component 16. This feature prevents the noise current from mixing into the GND of the control-circuit board 10, thereby making it possible to reduce the occurrence of malfunction of the control circuit.

Here, if the path electric length ranging from the noise-removing component 16 to the input of the amplifier 9 is considered as a monopole antenna, a standing wave arises when the path electric length is equal to the one-fourth of the wavelength of the noise current. As a result, the noise current ceases to flow up to the noise-removing component 16. This result is also basically the same when the path electric length is equal to the three-fourth, five-fourth, and . . . of the wavelength of the noise current. These consequences indicate that the noise cannot be reduced when the frequency of the noise current becomes higher (from the wavelength's standpoint, when the wavelength becomes shorter).

Embodiment 3

Figure 3:
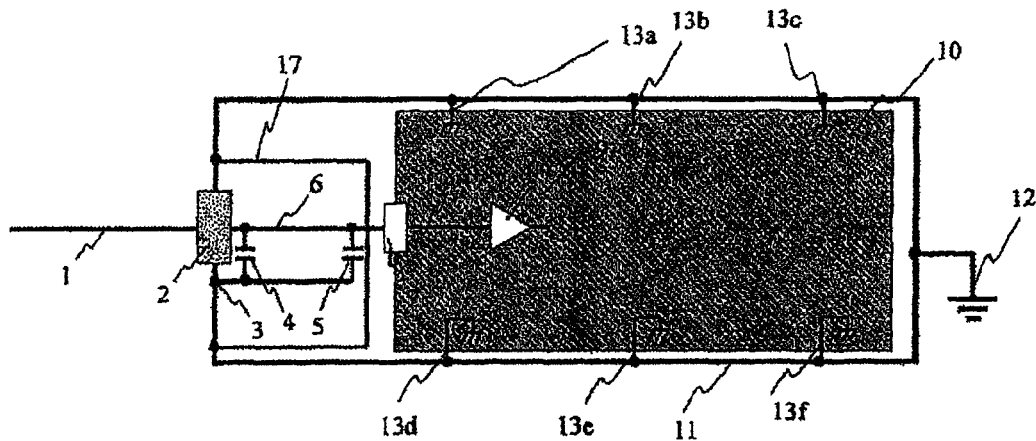
FIG. 3 is an explanatory diagram for explaining a third embodiment of the power conversion apparatus according to the present invention.

Next, referring to FIG. 3, the explanation will be given below concerning a third embodiment of the present invention. FIG. 3 is an explanatory diagram for explaining the third embodiment of the power conversion apparatus according to the present invention. FIG. 3 is a top view of the power conversion apparatus in FIG. 12 in the case where the cover 201 is removed therefrom.

The point in which the power conversion apparatus in FIG. 3 differs from the one in FIG. 1 is as follows: Namely, a shield 17 is set up inside the case 11 of the power conversion apparatus in such a manner that the shield 17 surrounds the noise-removing components 4 and 5 and the signal wiring 6. Namely, the shield 17 is so added as to surround the noise-removing components 4 and 5 and the signal wiring 6. This configuration makes it possible to prevent the noise from being re-radiated from the signal wiring 6.

Figure 4:
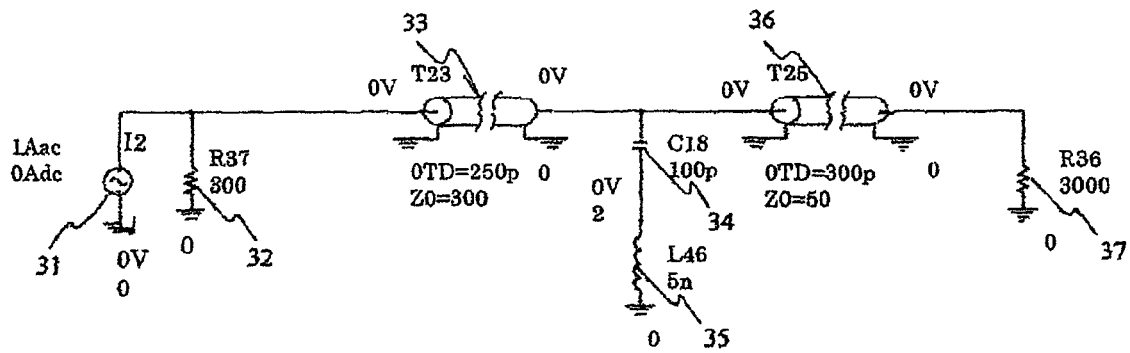
FIG. 4 is a diagram for illustrating a simulation model in the conventional power conversion apparatus.
Figure 5:
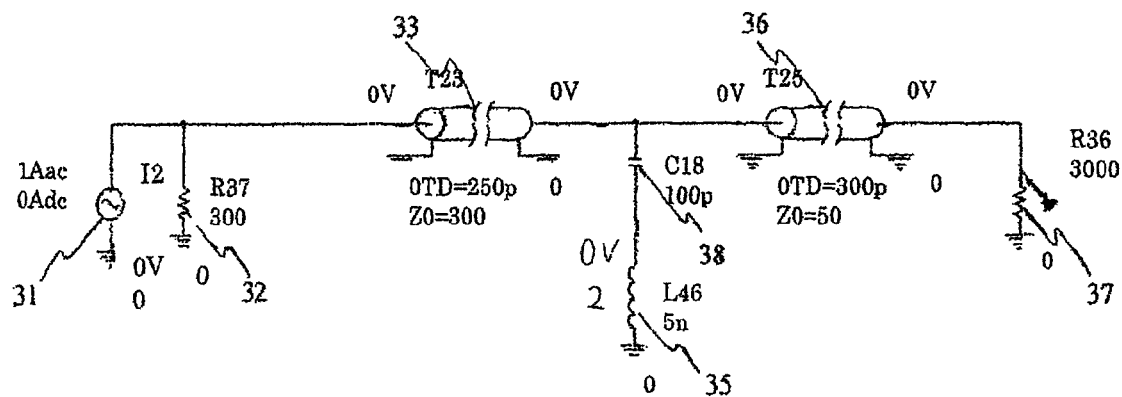
FIG. 5 is a diagram for illustrating a simulation model in the power conversion apparatus according to the present invention.
Figure 6:
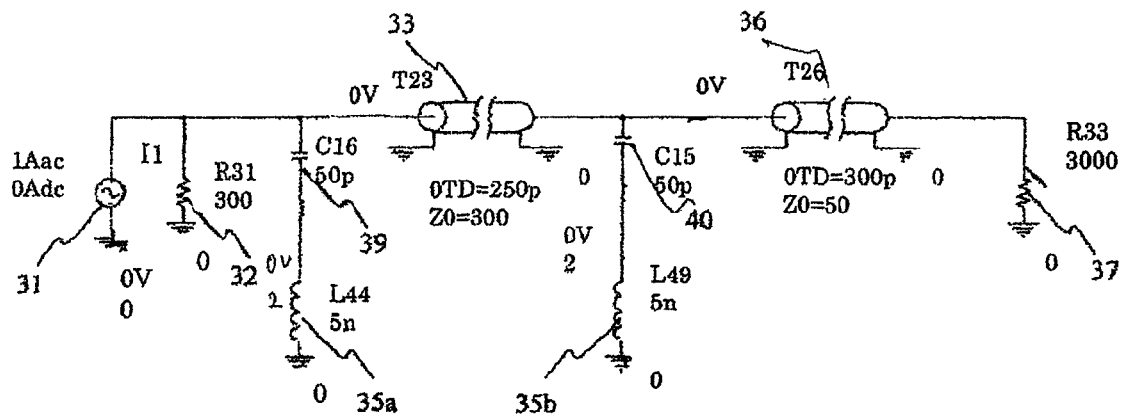
FIG. 6 is a diagram for illustrating a simulation model in the power conversion apparatus according to the present invention.
Figure 7:
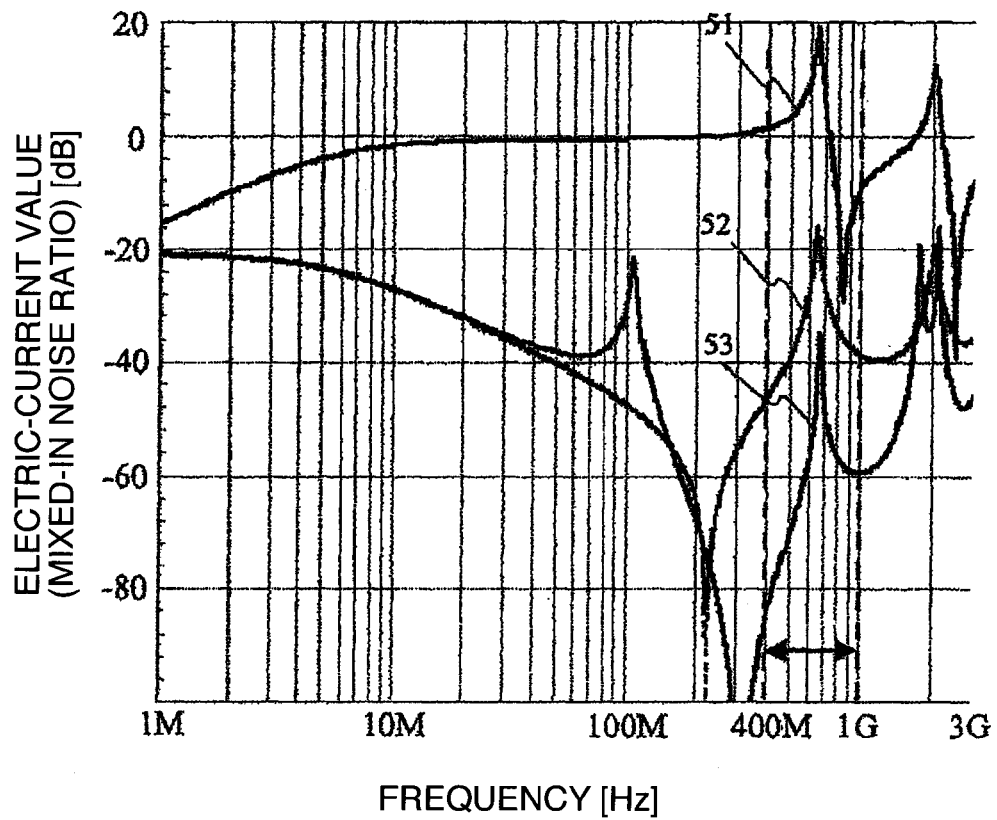
FIG. 7 is a diagram for illustrating the simulation result in the power conversion apparatus according to the present invention.

Next, referring to FIG. 4 through FIG. 7, the explanation will be given below regarding the simulation result of current-transfer characteristics from the external-appliance-connection-use connector 2 to the amplifier 9. FIG. 4 is a diagram for illustrating a simulation model in the conventional power conversion apparatus. FIG. 5 and FIG. 6 are diagrams for illustrating simulation models in the power conversion apparatus according to the present invention. FIG. 7 is a diagram for illustrating the simulation result in the power conversion apparatus according to the present invention.

In FIG. 4 to FIG. 6, a current source 31 and an output resistor 32 indicate a noise-current source. With respect to a signal wiring 33 (which is equivalent to the signal wiring 6 in FIG. 1) between the external-appliance-connection-use connector 2 and the board connector 7, the maximum frequency of the noise is set at 250 ps, i.e., the one-fourth of the wavelength of the noise at 1 GHz, and the characteristics impedance is set at 300 Ω.

With respect to a signal wiring 36 on the control-circuit board, the delay time, the characteristics impedance, and the input resistance of the amplifier 9 are set at 300 ps, 50Ω, and 3 kΩ, respectively. It is assumed that a noise-removing component 34 is mounted on the control-circuit board, and that noise-removing components C38, C39, and C40 are respectively connected to case GNDs. Here, the noise-removing components 34 and 38 are set at 100 pF, and noise-removing components 39 and 40 are set at 50 pF. Inductors 35, 35a, and 35b are parasitic inductances of the GND wirings.

FIG. 7 illustrates the noise-current amounts in three different frequency-response characteristics. Reference numerals 51, 52, and 53 denote the noise-current amount flowing into the noise-removing component 34 in FIG. 4, the noise-current amount flowing into the input resistor 37 in FIG. 5, and the noise-current amount flowing into the input resistor 37 in FIG. 6, respectively. The noise-current amounts 52 and 53 illustrated in FIG. 7 indicate that the signals are scarcely deteriorated with respect to the frequencies in proximity to 1 MHz. Here, attention is focused on the 400-MHz to 1-GHz frequency range in which the malfunctions are highly likely to occur in the immunity test. Then, this attention indicates that the noise-current amount 53 is successfully reduced by a 20-dB-or-more amount as compared with the other configurations. Accordingly, it is confirmed that the present invention is capable of suppressing the noise which will mix into the apparatus. Consequently, a prospect is acquired that the present invention is capable of reducing the occurrence of malfunctions of the in-apparatus circuits.

Embodiment 4

Figure 8:
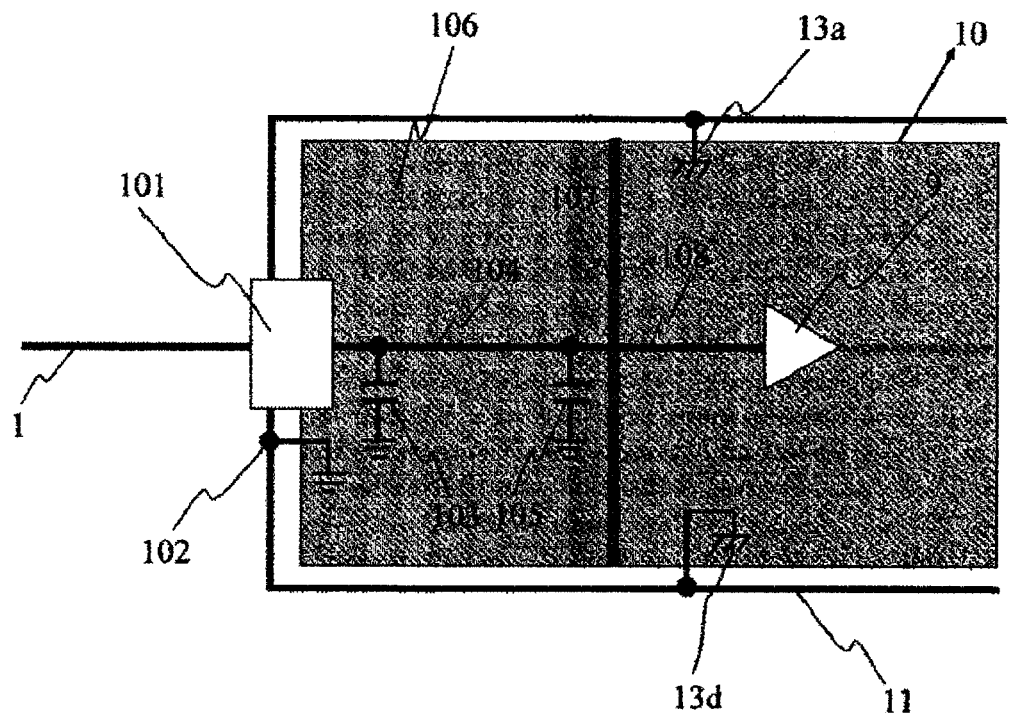
FIG. 8 is an explanatory diagram for explaining a fourth embodiment of the power conversion apparatus according to the present invention.

Next, referring to FIG. 8, the explanation will be given below regarding a fourth embodiment of the present invention. FIG. 8 is an explanatory diagram for explaining the fourth embodiment of the power conversion apparatus according to the present invention. FIG. 8 is a top view of the power conversion apparatus in FIG. 12 in the case where the cover 201 is removed therefrom when an external-appliance-connection-use connector 101 is directly implemented on a control-circuit board 106.

The point in which the power conversion apparatus in FIG. 8 differs from the one in FIG. 1 is as follows: Namely, the GND pattern on the control-circuit board 10 is separated by a slit 107. In the present fourth embodiment, each of noise-removing components 103 and 105 is connected to the GND. Moreover, the noise-removing components 103 and 105 are deployed in such a manner that the components 103 and 105 are parallel to each other with reference to a signal wiring 104 for establishing the connection between the external-appliance-connection-use connector 101 and the amplifier 9.

Here, the control-circuit board 10 is connected to the case GNDs 13a and 13b, and the external-appliance-connection-use connector 101 is connected to a case GND 102. The noise-removing components 103 and 105 and the signal wiring 104 are mounted on the side of the external-appliance-connection-use connector 101. This deployment allows implementation of a configuration which is basically the same as the one in FIG. 1. Furthermore, when the control-circuit board 10 has a four-or-more-layer layer configuration, it becomes possible to provide the shield effect illustrated in FIG. 3 by implementing the signal wiring 104 as a strip line.

Embodiment 5

Figure 9:
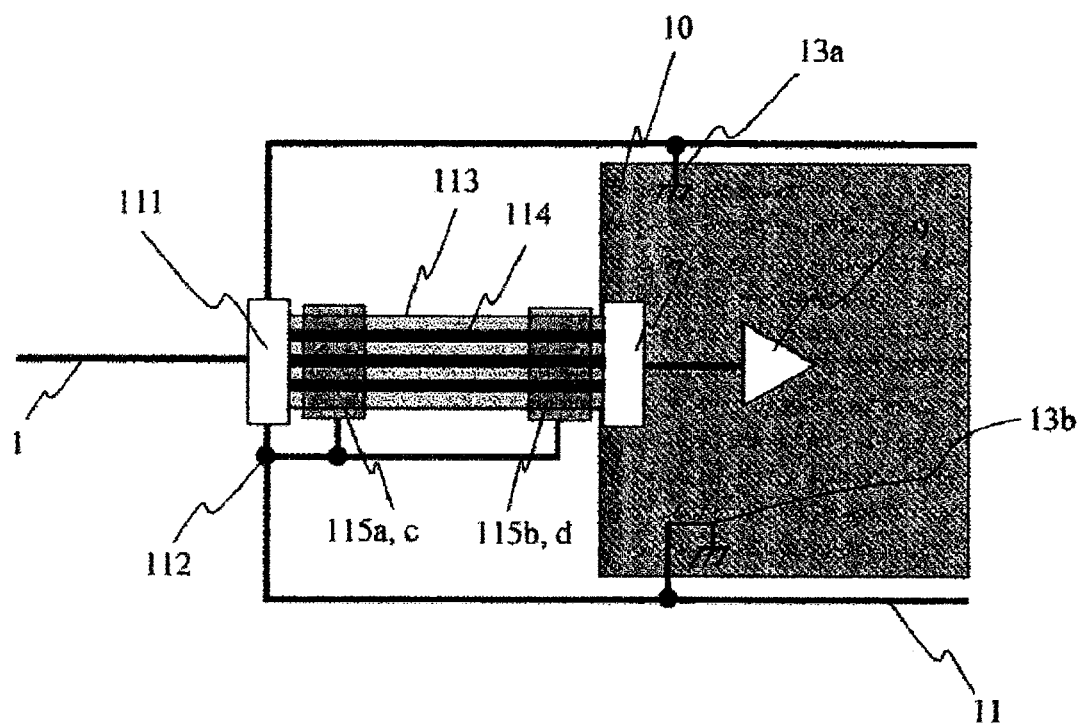
FIG. 9 is an explanatory diagram for explaining a fifth embodiment of the power conversion apparatus according to the present invention.
Figure 10:
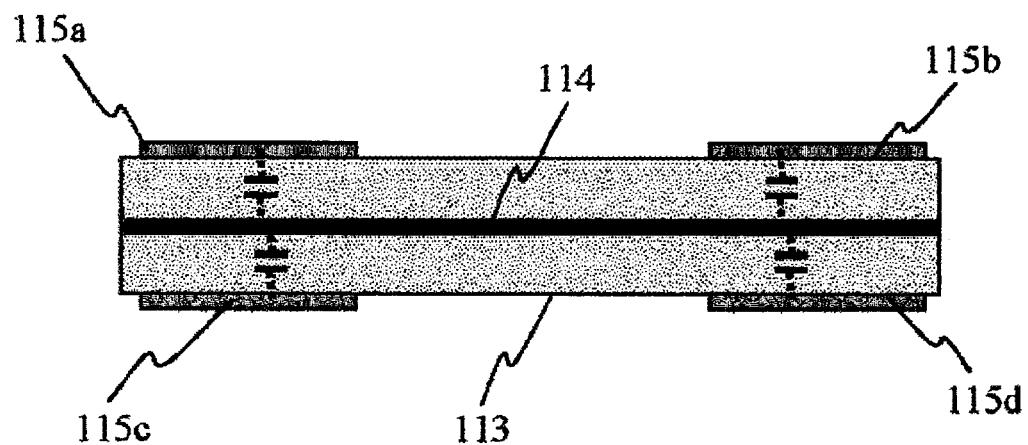
FIG. 10 is an explanatory diagram for explaining the fifth embodiment of the power conversion apparatus according to the present invention.

Next, referring to FIG. 9 and FIG. 10, the explanation will be given below concerning a fifth embodiment of the present invention. FIG. 9 and FIG. 10 are explanatory diagrams for explaining the fifth embodiment of the power conversion apparatus according to the present invention. FIG. 9 illustrates the power conversion apparatus where an external-appliance-connection-use connector 111 and the control-circuit board 10 are connected to each other by using a wiring member 113 such as, e.g., FPC (: Flexible Printed Circuits). FIG. 10 is the cross-sectional diagram of the wiring member 113 acquired when seen from the side direction.

The point in which the power conversion apparatus in FIG. 9 differs from the one in FIG. 1 is as follows: Namely, the noise-removing elements such as the capacitors are not set up between the signal wiring and the connection point. Instead, ground patterns 115a to 115d are set up at both ends of a signal wiring 114 for establishing the connection between an external-appliance-connection-use connector 111 and the board connector 7. Moreover, the wiring member 113 is so set up as to cover the signal wiring 114.

Here, the wiring member 113 has a two-or-more-layer layer configuration. Namely, for example, as is the case with the cross-sectional diagram of the wiring member 113 illustrated in FIG. 10, the ground patterns 115a to 115d are deployed over and under the signal wiring 114. This deployment makes it possible to cause the wiring member 113 to be equipped with parasitic-capacity components (i.e., noise-removing components) coupled to the GND, thereby allowing implementation of a configuration which is basically the same as the one in FIG. 1.

Embodiment 6

Figure 11:
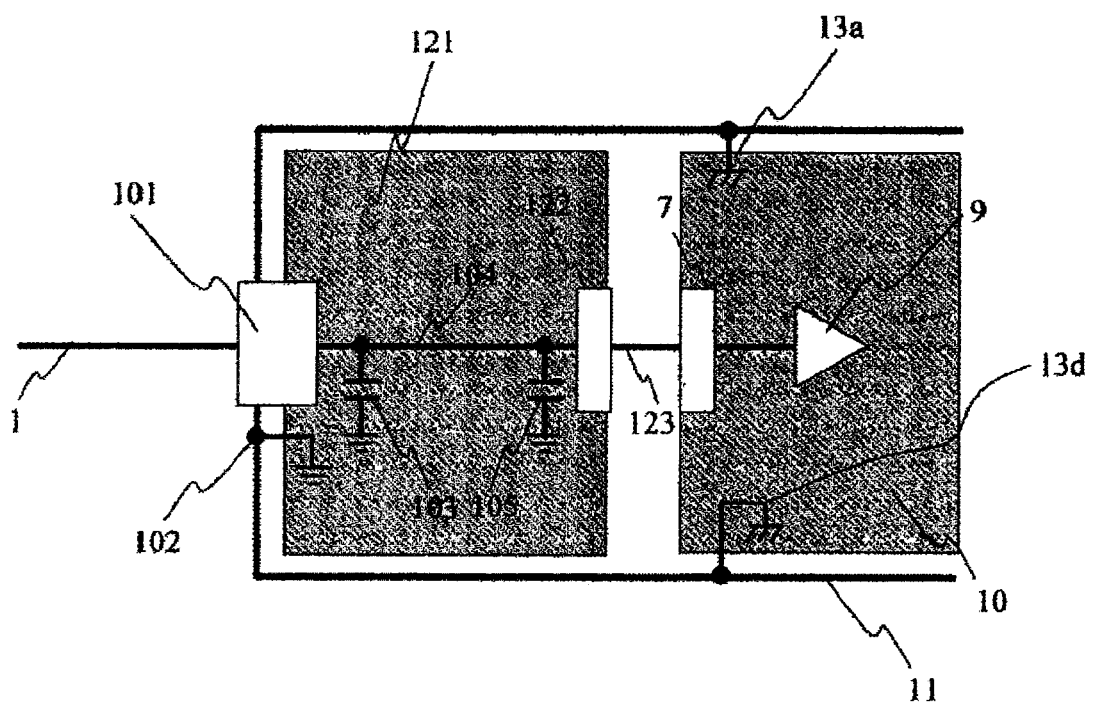
FIG. 11 is an explanatory diagram for explaining a sixth embodiment of the power conversion apparatus according to the present invention.

Next, referring to FIG. 11, the explanation will be given below regarding a sixth embodiment of the present invention. FIG. 11 is an explanatory diagram for explaining the sixth embodiment of the power conversion apparatus according to the present invention. FIG. 11 is a top view of the power conversion apparatus when the external-appliance-connection-use connector 101 is directly implemented on a connector board 121.

The point in which the power conversion apparatus in FIG. 11 differs from the one in FIG. 1 is as follows: Namely, the external-appliance-connection-use connector 101 and a board connector 122 are connected to each other via the signal wiring 104. Also, the board connector 122 and the board connector 7 are connected to each other via a signal wiring 123. Furthermore, the connector board 121 and the control-circuit board 10 are connected to mutually different GNDs, respectively.

The noise-removing components 103 and 105 and the signal wiring 104 are deployed on the connector board 121. This deployment allows implementation of a configuration which is basically the same as the one in FIG. 1.

Based on the embodiments, the concrete explanation has been given so far concerning the invention devised by the present inventor. It is needless to say, however, that the present invention is not limited to the above-described embodiments, and that a variety of modifications can be made within a scope of not departing from the spirit thereof.

Also, as the noise-removing units in the present invention, the capacitors have been illustrated in the accompanying drawings. Not being limited to the capacitors, however, the noise-removing units may also be some other noise-component-removal-capable units.

Also, the power conversion apparatus according to the present invention may also be configured in such a manner that the respective embodiments of the present first to sixth ones are combined with each other.

REFERENCE SIGNS LIST

1 . . . control wiring, 2, 111 . . . external-appliance-connection-use connectors, 3 . . . connection point, 13a to 13f, 102, 112 . . . case GNDs, 4, 5, 16, 34, 38, 39, 40, 103, 105 . . . noise-removing components, 6, 8, 18, 33, 36, 104, 108, 114, 123 . . . signal wirings, 7, 122 . . . board connectors, 9 . . . amplifier, 10, 106, 202 . . . control-circuit board, 11 . . . case, 12 . . . chassis GND, 14a, 14b noise-current waveforms, 31 . . . current source, 32 . . . output resistor, 35, 35a, 35b . . . parasitic inductances, 51, 52, 53 . . . currents, 113 . . . wiring member, 115a to 115d . . . ground patterns (ground) planes, 121 . . . connector board, 201 . . . cover, 203 . . . heat-liberation-use sheet, 204 . . . DC terminal, 205 . . . control-circuit-board-use base, 206 . . . DC connector, 207 . . . smoothing capacitor, 208 . . . external-appliance-connection-use connector, 209, 230 . . . power modules, 210 . . . cooling mechanism, 211 . . . gate driver (board), 212 . . . AC connector, 213 . . . case, 214. DC bus bar (plus side), 221 . . . external appliance, 222 . . . signal wiring, 223 . . . power-source wiring, 224 . . . 12-V battery, 225 . . . board connection line, 226 . . . high-voltage DC cable, 228 . . . chassis GND, 229 . . . power-conversion-apparatus GND (connection point), 231 . . . motor cable (shield cable), 232 . . . motor

The invention claimed is:

1. A power conversion apparatus, comprising:
a housing;
connection terminals provided on said housing;
a control-circuit unit provided inside said housing;
a wiring for establishing connection between said connection terminals and said control-circuit unit;
a first noise-removing component connected between said wiring and ground potential of said housing; and
a second noise-removing component connected between said wiring and said ground potential of said housing, and also in parallel to said first noise-removing component;
wherein a distance is equal to one-fourth of wavelength of a noise at its maximum frequency, said noise being to be removed, said distance being a distance between a position on said wiring to which said first noise-removing component is connected and a position on said wiring to which said second noise-removing component is connected.

2. The power conversion apparatus according to claim 1, wherein
a shield is so provided inside said housing as to surround at least a partial portion of said first noise-removing component, said second noise-removing component, and said wiring.

3. The power conversion apparatus according to claim 1, wherein
a GND pattern is set up on a control-circuit board which surrounds said first noise-removing component, said second noise-removing component, said wiring, and said control-circuit unit, said GND pattern being separated into a plurality of GND patterns by a slit.

4. The power conversion apparatus according to claim 3, wherein
said GND pattern is separated into at least two GND patterns by said slit, said two GND patterns being a first GND pattern and a second GND pattern, said first GND pattern surrounding a partial portion of said first noise-removing component, said second noise-removing component, and said wiring, said second GND pattern surrounding said control-circuit unit.

5. The power conversion apparatus according to claim 1, wherein
a wiring member is provided between a connector and said connection terminals, said connector being provided on said power conversion apparatus in order to establish connection between said power conversion apparatus and an external appliance.

6. The power conversion apparatus according to claim 5, wherein
said wiring member has a two-or-more-layer layer configuration which is constituted from two or more layers.

7. The power conversion apparatus according to claim 5, wherein
said wiring member is FPC.

8. A power conversion apparatus, comprising:
a housing;
a connection terminal provided on said housing;
a control-circuit unit provided inside said housing;
a wiring connected between said connection terminal and said control-circuit unit;
a first noise-removing component connected between said wiring and ground potential of said housing; and
a second noise-removing component connected between said wiring and said ground potential of said housing in parallel to said first noise-removing component;
a first connector; and
a second connector, wherein
said connection terminal is constituted from at least two connection terminals, said two connection terminals being a first connection terminal and a second connection terminal,
said first connection terminal and said second connection terminal being connected to each other by a signal wiring,
said first connection terminal being deployed at a position which is closer to the first connector than said second connection terminal,
said power conversion apparatus, further comprising:
a first GND pattern; and
a second GND pattern,
said first GND pattern being so provided as to surround a portion ranging from said first connector to said first connection terminal, said second GND pattern being so provided as to surround a portion ranging from said second connection terminal to said control-circuit unit.

9. The power conversion apparatus according to claim 1, wherein
said control-circuit unit is any one of a microcomputer, a transceiver, or a comparator.

10. The power conversion apparatus according to claim 1, wherein
said first noise-removing component and said second noise-removing component are capacitors.

* * * * *